United States Patent
Sobanski et al.

(10) Patent No.: US 12,092,022 B2
(45) Date of Patent: Sep. 17, 2024

(54) FORWARD MOUNTED HYDROGEN STEAM INJECTED AND INTER-COOLED TURBINE ENGINE WITH OCTOPUS DUCTING

(71) Applicant: Raytheon Technologies Corporation, Farmington, CT (US)

(72) Inventors: Jon Erik Sobanski, Glastonbury, CT (US); Jacob C. Snyder, East Haddam, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/106,161

(22) Filed: Feb. 6, 2023

(65) Prior Publication Data
US 2024/0263578 A1  Aug. 8, 2024

(51) Int. Cl.
*F02C 3/30* (2006.01)
*F02C 3/22* (2006.01)

(52) U.S. Cl.
CPC ............ *F02C 3/30* (2013.01); *F02C 3/22* (2013.01); *F05D 2260/211* (2013.01)

(58) Field of Classification Search
CPC .... F02C 3/30; F02C 3/305; F02C 7/12; F01K 23/06; F01D 25/32
See application file for complete search history.

(56) References Cited

U.S. PATENT DOCUMENTS

| | | | |
|---|---|---|---|
| 2,447,696 A * | 8/1948 | Forsyth | F02C 3/30 60/264 |
| 3,266,564 A | 8/1966 | Sabatiuk | |
| 3,604,207 A | 9/1971 | Waidelich | |
| 4,934,139 A | 6/1990 | Newton et al. | |
| 10,184,372 B2 | 1/2019 | Shin et al. | |
| 10,421,553 B2 | 9/2019 | Suciu et al. | |
| 11,603,798 B1 * | 3/2023 | Terwilliger | F02C 7/18 |
| 11,635,022 B1 * | 4/2023 | Terwilliger | F02C 9/00 60/775 |
| 11,808,209 B1 * | 11/2023 | Sobanski | F02C 6/18 |
| 2015/0000298 A1 * | 1/2015 | McAlister | F02C 7/16 60/39.12 |
| 2016/0207631 A1 * | 7/2016 | Suciu | B64D 27/18 |
| 2023/0150678 A1 * | 5/2023 | Klingels | B01D 5/0081 244/55 |
| 2023/0258106 A1 * | 8/2023 | Terwilliger | F02C 3/30 60/775 |
| 2023/0366348 A1 * | 11/2023 | Alahyari | F02C 3/22 |
| 2023/0407768 A1 * | 12/2023 | Staubach | F02K 3/06 |

* cited by examiner

*Primary Examiner* — Gerald L Sung
(74) *Attorney, Agent, or Firm* — Carlson, Gaskey & Olds, P.C.

(57) ABSTRACT

A propulsion system for an aircraft includes a core engine that generates a core gas flow, a propulsor section that is driven by the core engine and disposed aft of the core engine, a nacelle that surrounds the core engine and the propulsor section, a water recovery system that is disposed in the nacelle, an exhaust duct where the core gas flow is directed radially outward from the core engine to the nacelle, an evaporator assembly that is in thermal communication with the exhaust duct where water is recovered by the water recovery system and is heated to generate a steam flow that is subsequently communicated to the core engine.

16 Claims, 7 Drawing Sheets

FORWARD MOUNTED HYDROGEN STEAM INJECTED AND INTER-COOLED TURBINE ENGINE WITH OCTOPUS DUCTING

STATEMENT REGARDING FEDERALLY SPONSORED RESEARCH OR DEVELOPMENT

This invention was made with Government support under Contract No.: DE-AR0001561 awarded by the United States Department of Energy, Office of ARPA-E. The Government has certain rights in this invention.

TECHNICAL FIELD

The present disclosure relates generally to a hydrogen powered aircraft propulsion system and, more particularly to a hydrogen steam injected and intercooled turbine engine including a forward mounted gas generator and ducting for routing flows through heat exchangers disposed within a nacelle.

BACKGROUND

Reduction and/or elimination of carbon emissions generated by aircraft operation is a stated goal of aircraft manufacturers and airline operators. Gas turbine engines compress incoming core airflow, mix the compressed airflow with fuel that is ignited in a combustor to generate a high energy exhaust gas flow. Some energy in the high energy exhaust flow is recovered as it is expanded through a turbine section. Much of the heat energy within the exhaust gas flow is lost. Some of the heat energy may be recaptured and used to generate a steam flow that is injected into the core flow. The steam flow increases engine efficiencies by increasing mass flow without additional work required by the turbine section. The size required for efficient heat exchangers to capture heat and generate a steam flow may be large compared to the overall engine size and may be a limiting factor.

Turbine engine manufacturers continue to seek further improvements to engine performance including improvements to reduce environmental impact while improving propulsive efficiencies.

SUMMARY

A propulsion system for an aircraft according to one example disclosed embodiment includes, among other possible things a core engine that generates a core gas flow, a propulsor section that is driven by the core engine and disposed aft of the core engine, a nacelle that surrounds the core engine and the propulsor section, a water recovery system that is disposed at least in part in the nacelle, an exhaust duct where the core gas flow is directed radially outward from the core engine to the nacelle, an evaporator assembly that is in thermal communication with the exhaust duct where water is recovered by the water recovery system and is heated to generate a steam flow that is subsequently communicated to the core engine.

In another embodiment of the foregoing propulsion system, the propulsion system includes a refrigeration system that is disposed aft of the propulsor section where a cooling medium is circulated through a cooling circuit to cool a portion of the water recovery system.

In another embodiment of any of the foregoing propulsion systems, the refrigeration system includes a refrigerant condenser for cooling the cooling medium. The refrigerant condenser is in thermal communication with a bypass flow through the propulsor section for condensing the cooling medium.

In another embodiment of any of the foregoing propulsion systems, the water recovery system includes a condenser assembly and a water separator. The cooling circuit is in thermal communication with the condenser assembly for condensing liquid water from the core gas flow.

In another embodiment of any of the foregoing propulsion systems, the condenser assembly includes a plurality of condensers that are disposed about a circumference of the nacelle.

In another embodiment of any of the foregoing propulsion systems, the exhaust duct includes a plurality of passages that extend radially outward from the core engine to a corresponding one of the plurality of condensers such that core gas flow is communicated through the plurality of passages to each of the plurality of condensers.

In another embodiment of any of the foregoing propulsion systems, the evaporator assembly includes a plurality of evaporators that are disposed within the nacelle and are in thermal communication with a portion of each of the plurality of passages of the exhaust duct.

In another embodiment of any of the foregoing propulsion systems, each of the plurality of passages of the exhaust duct include a radial portion that routes core gas flow radially outward and a circumferential portion is in thermal communication with at least one of the plurality of evaporators.

In another embodiment of any of the foregoing propulsion systems, each of the plurality of passages include an outlet that communicates the core gas flow to a corresponding one of the plurality of condensers.

In another embodiment of any of the foregoing propulsion systems, the propulsion system includes a gearbox that is driven by the core engine and coupled to drive the propulsor.

In another embodiment of any of the foregoing propulsion systems, the propulsion system includes an intercooling system that is configured to inject water into a compressor section of the core engine to reduce a temperature of a core airflow within the core flow path. The intercooling system receives water from the water recovery system.

A propulsion system for an aircraft according to another example disclosed embodiment includes, among other possible things a core engine that includes a core flow path where air is compressed in a compressor section, communicated to a combustor section, mixed with a hydrogen based fuel and ignited to generate a core gas flow that is expanded through a turbine section. The propulsion system includes a hydrogen fuel system that is configured to supply hydrogen fuel to the combustor through a fuel flow path, a propulsor section that is driven by the core engine and disposed aft of the core engine, a nacelle that surrounds the core engine and the propulsor section, a condenser assembly that is disposed at least partially within the nacelle, an exhaust duct where the core gas flow is directed radially outward from the core engine to the condenser assembly in the nacelle, an evaporator assembly that is in thermal communication with the exhaust duct where water recovered by the condenser assembly is heated to generate a steam flow that is injected into the core flow path, and a refrigeration system that is disposed aft of the propulsor section where a cooling medium is circulated through a cooling circuit to cool a portion of the water recovery system.

In another embodiment of the foregoing propulsion system, the refrigeration system includes a refrigerant condenser for cooling the cooling medium. The refrigerant condenser is in thermal communication with a bypass flow through the propulsor section for condensing the cooling medium.

In another embodiment of any of the foregoing propulsion systems, the condenser assembly includes a plurality of condensers that are disposed about a circumference of the nacelle.

In another embodiment of any of the foregoing propulsion systems, the exhaust duct includes a plurality of passages that extend radially outward from the core engine to a corresponding one of the plurality of condensers such that core gas flow is communicated through the plurality of passages to each of the plurality of condensers.

In another embodiment of any of the foregoing propulsion systems, each of the plurality of passages of the exhaust duct include a radial portion that routes core gas flow radially outward and a circumferential portion is in thermal communication with the evaporator assembly and an outlet communicates the core gas flow to a corresponding one of the plurality of condensers.

A nacelle assembly for a turbine engine according to another example disclosed embodiment includes, among other possible things a nacelle housing that surrounds a core engine and a propulsor section, a condenser assembly that is supported at least partially within the nacelle housing, the condenser assembly is configured to recover water from a core gas flow that is generated by the core engine, an exhaust duct that extends between the nacelle housing and the core engine, the core gas flow is directed radially outward through the exhaust duct to the condenser assembly, and an evaporator assembly that is supported within the nacelle housing and is in thermal communication with at least a portion of the exhaust duct where heat from the core gas flow is utilized to heat a water flow to generate a steam flow injected into the core flow path.

In another embodiment of the foregoing nacelle assembly, the exhaust duct includes a plurality of passages with each including a radial portion where the core gas flow is directed radially outward to the condenser assembly. A circumferential portion is in thermal communication with the evaporator assembly and an outlet communicates the core gas flow to the condenser assembly.

In another embodiment of any of the foregoing nacelle assemblies, the exhaust duct extends forward of the propulsor section to an aft end of the core engine.

In another embodiment of any of the foregoing nacelle assemblies, the nacelle housing includes a bypass passage for a fan airflow that extends between a forward inlet and an aft exhaust opening. The exhaust duct is supported within the forward inlet and the core engine is supported engine forward of the exhaust duct.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
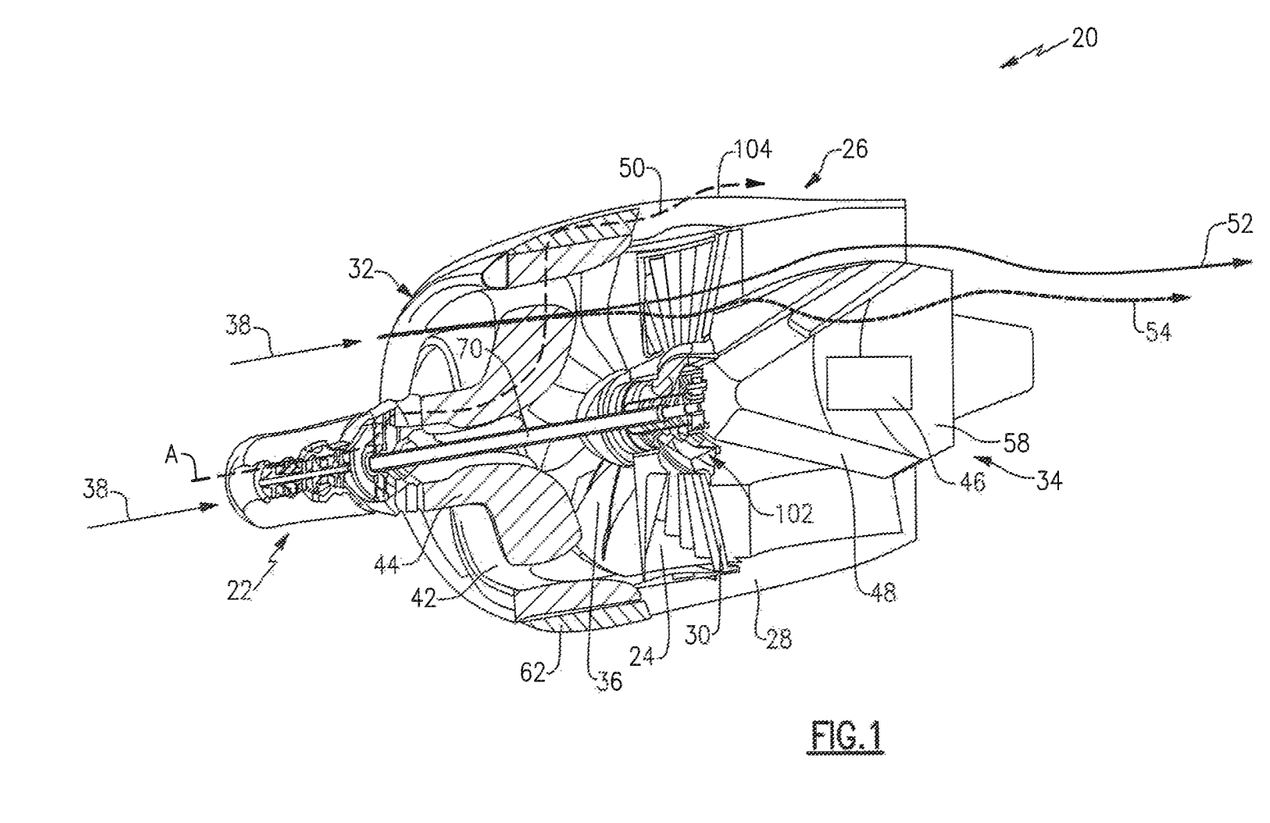
FIG. 1 is a cross-sectional view of an example aircraft propulsion system.
Figure 2:
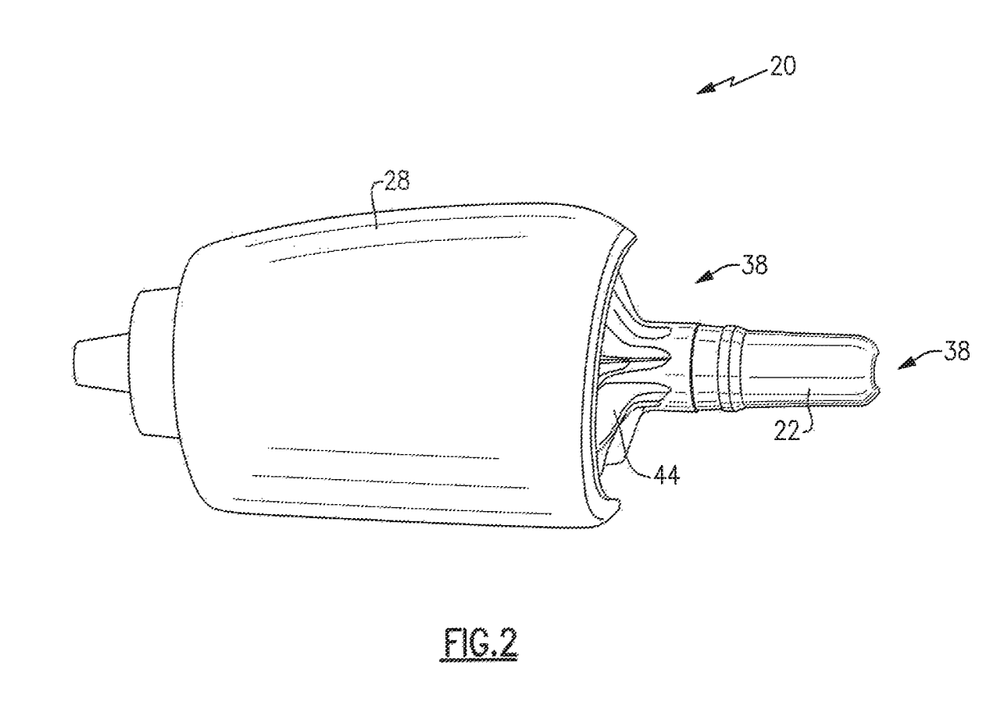
FIG. 2 is a side view of the example aircraft propulsion system.

FIGS. 1 and 2 schematically illustrate an example hydrogen steam injected inter-cooled aircraft propulsion system that is generally indicated at 20. Heat exchangers utilized to recover and generate steam for injection into a core flow operate most effectively with low pressure drops that require large forward facing areas. The example propulsion system 20 incorporates heat exchangers for evaporator and condenser systems at least partially within a nacelle assembly such that larger forward surface areas can be utilized. Moreover, a gas generating core engine is mounted forward of a propulsive fan to free additional space within the nacelle assembly for a refrigeration system.

The propulsion system 20 includes a gas generating core engine 22 supported engine forward of a propulsive fan 24. The fan 24 is disposed within a nacelle assembly 26 including a nacelle housing 28. The core engine 22 drives the propulsive fan 24 through a speed reduction gear box 72. A condenser assembly 62 and evaporator assembly 42 are disposed in a forward portion of the nacelle housing 28. A core gas flow 50 is communicated radially outward through an exhaust duct 44 to the evaporator assembly 42 and the condenser assembly 62. Locating the evaporator assembly 42 and the condenser assembly 62 within the nacelle housing 28 provides larger surfaces for the required heat exchangers to enhance thermal transfer.

In one example embodiment, the core engine 22 is supported forward of an inlet 32 to the nacelle assembly 26. An inlet airflow 38 is communicated into the core engine 22 and through the nacelle inlet 32 to the propulsive fan 24. The nacelle assembly 26 includes a housing 28 that defines an interior passage 36 between the inlet 32 and an exhaust outlet 34. A plurality of static vanes 30 support a central support structure 102 within the nacelle assembly 26 about an engine longitudinal axis A. The core engine 22 generates a core flow 50 that is routed radially outward through the exhaust duct 44. The core flow 50 sequentially proceeds through the evaporator assembly 42 and a condenser assembly 62. In the evaporator assembly 42, heat is used to generate a steam flow from recovered water. In the condenser assembly 62, water is condensed and separated from the core flow 50. The remaining core flow 50 is routed through a nacelle passage 104 to the ambient environment.

Fan flow 52 is exhausted through the exhaust opening 34 to provide a propulsive thrust. A portion of the fan flow 52 is communicated as a cooling flow 54 to a refrigerant assembly 46. The refrigerant assembly 46 includes a condenser 48 that is supported aft of the propulsive fan 24 and vanes 30. In one disclosed example, portions of the refrigerant system 46 are supported in a tail cone 58. The refrigerant assembly 46 circulates a cooling medium to the condenser assembly 62 to aid in condensing water from the core gas flow 50.

Figure 3:
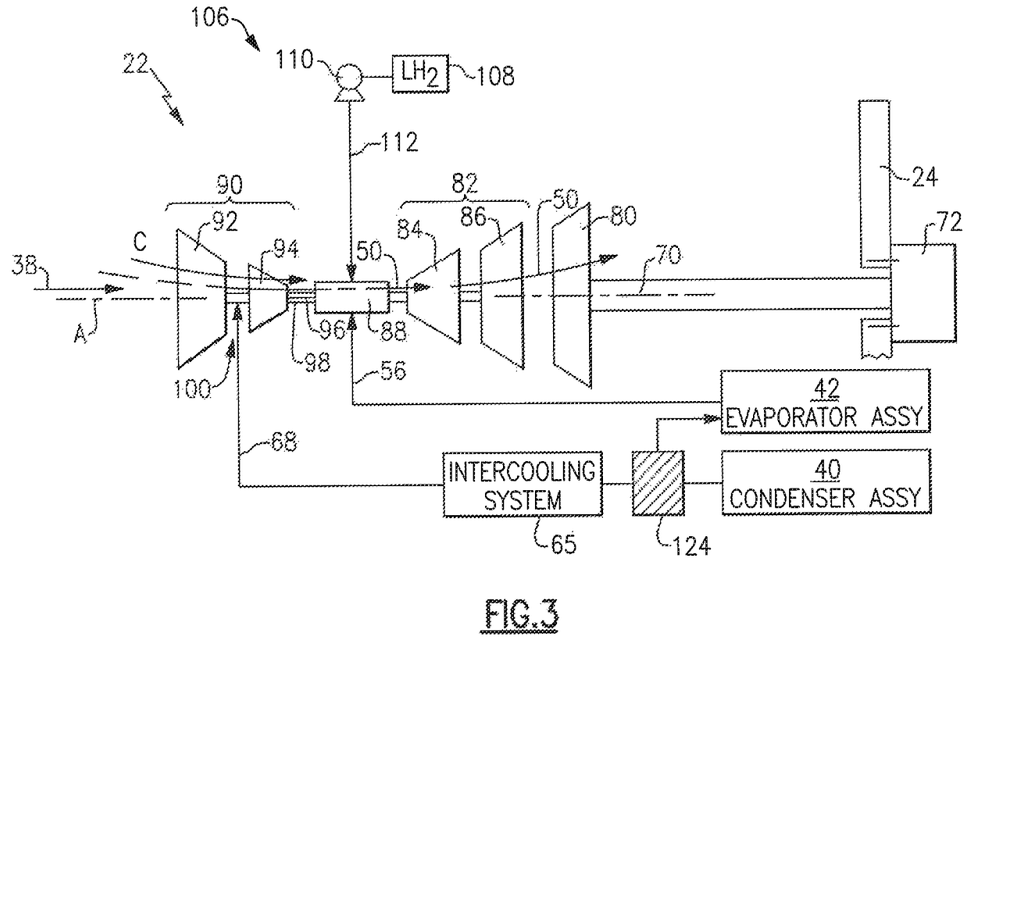
FIG. 3 is a schematic cross-section of the example aircraft propulsion system.

Referring to FIG. 3, with continued reference to FIGS. 1 and 2, the core engine 22 is schematically shown and defines a portion of the core airflow path C for the core flow 50. An inlet airflow 38 is routed through serially through a compressor section 90, a combustor 88 and a turbine section 82 disposed along the axis A. In the compressor section 90, the inlet airflow 38 is compressed and mixed with a hydrogen ($H_2$) fuel flow 112 and ignited to generate the core gas flow 50 that expands through the turbine section 82 where energy is extracted and utilized to drive the compressor section 90.

The disclosed example core engine embodiment 22 includes the compressor section with a low pressure compressor (LPC) 92 coupled to a low pressure turbine (LPT) 86 through an outer shaft 98. A high pressure compressor (HPC) 94 is coupled to a high pressure turbine 84 through an inner shaft 96. A power turbine 80 is coupled to a shaft 70 that drives the fan 24 through the gear box 72. The gear box 72 may be of any configuration utilized to provide a desired speed change between the power turbine 80 and fan 24. Although an example core engine configuration is disclosed, other engine architectures could be utilized and are within the contemplation of this disclosure.

Moreover, although the example core engine 22 is shown and disclosed by way of example as being disposed along the axis A along with the fan 24, the core engine may be disposed offset from the axis A. As the power turbine 80 is not mechanically coupled to the core engine 22 and is driven by the core flow 50, the core engine 22 and the power turbine 80 and fan 24 could be on different axes. Moreover, the core engine 22 may be angled relative to an axis of rotation of the fan 24. Accordingly, mechanically decoupling of the fan 24 from the core engine 22 provides for offset and angled relative orientations of the core engine 22. Such offset and angular orientations of the core engine 22 are within the contemplation and scope of this disclosure.

The core engine 22 is configured to burn hydrogen provided by a fuel system 106. The fuel system 106 includes a liquid hydrogen ($LH_2$) tank 108 in communication with at least one pump 110. The pump 110 drives the fuel flow 112 to the combustor 88. Although hydrogen is shown and described by way of example, other non-carbon based fuels could also be utilized and are within the scope and contemplation of this disclosure. Additionally, traditional carbon-based fuels could also be utilized and are within the contemplation and scope of this disclosure.

A condenser assembly 40 recovers water that is communicated to a water tank 124. From the water tank, water is communicated to the intercooling system 65 and to the evaporator 42.

A steam flow 56 is injected into the core flow path C. The core engine 22 has an increased power output from the injected steam flow 56 due to an increasing mass flow through the turbine section 82 without a corresponding increase in work from the compressor section 90. An example engine operation cycle may include up to (or more than) 35% steam-air-ratios (SAR) and may be assisted by a multiple fold (e.g., 2×, 3×, etc.) increase in moisture from burning $H_2$ as the fuel.

An intercooling system 65 provides an intercooling water flow 68 that is communicated to the compressor section 90 to reduce a temperature of the core flow 50 and increase mass flow. In one disclosed example embodiment, water flow 68 is injected at a location 100 between the LPC 92 and HPC 94. The water flow 68 provides reduced temperatures and increased mass flow that decreases the work required by the compressor section 90. Water may also be used as a cooling flow to cool other sections of the core engine 22 such as for example, the turbine section 82. Although an example intercooling system 65 is schematically shown by way of example, other intercooling systems that utilized a flow of water for cooling could be utilized and are within the contemplation of this disclosure.

Figure 4:
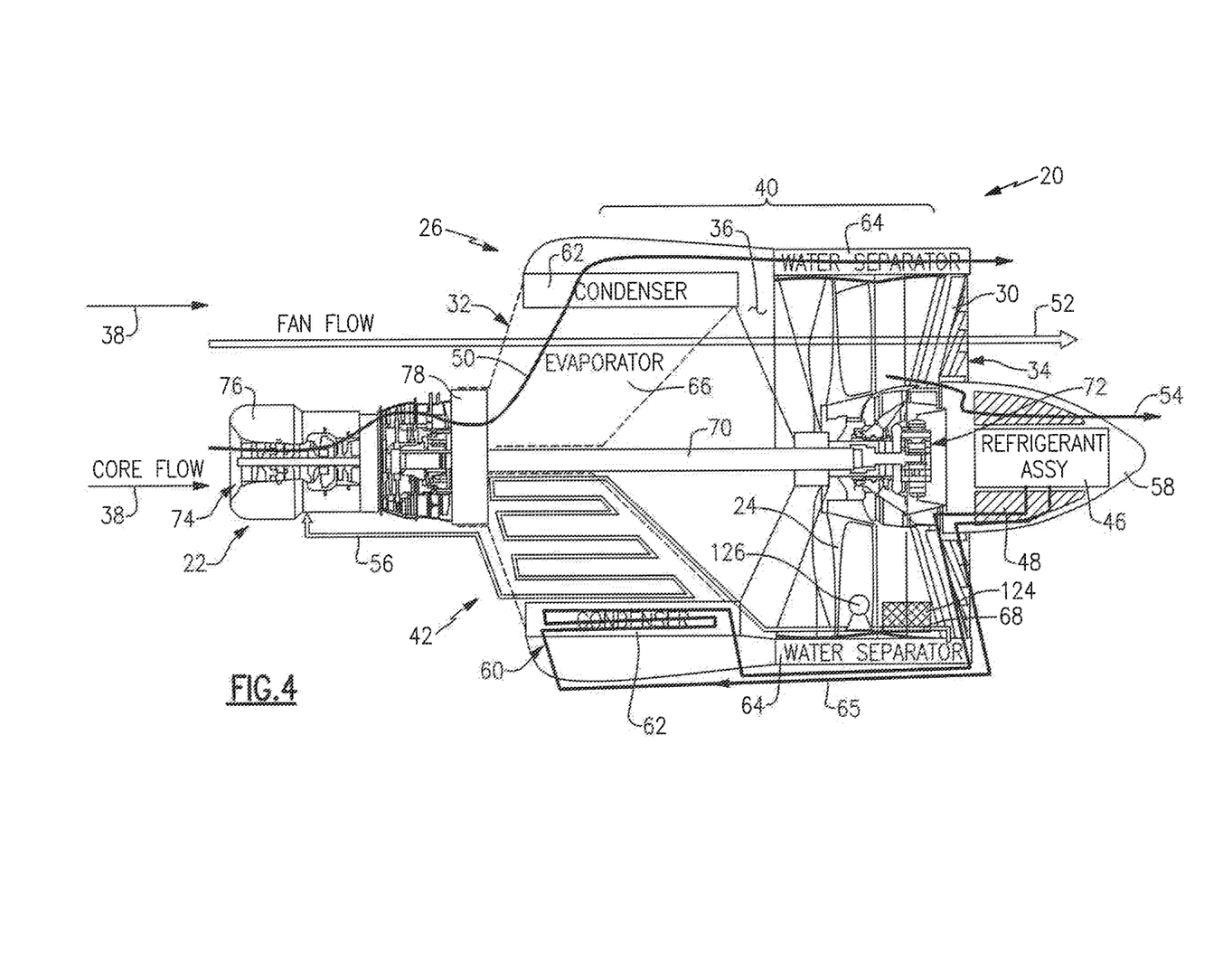
FIG. 4 is a schematic view of a core gas generating portion of the example aircraft propulsion system.

Referring to FIG. 4 with continued reference to FIGS. 1, 2, and 3, the core engine 22 is disposed within a housing 76 that defines a core inlet 74. The core housing 76, is supported forward of the nacelle assembly 26. A turbine exhaust case 78 defines the outlet for the core flow 50 from the core engine 22.

A condenser/water recovery system 40 includes a plurality of condensers 62 disposed about a circumference of the nacelle assembly 26. The plurality of condensers 62 are positioned at a forward location proximate to the inlet 32. The core flow 50 is cooled in each of the plurality of condensers 62 to condense water into a liquid form. The liquid water is separated in a water separator 64 and communicated to an evaporator assembly 42.

Each of the plurality of condensers 62 are in communication with a cold sink to enhance condensation of water from the core flow 50. In one disclosed example embodiment, the refrigeration system 46 includes a closed loop cooling circuit 60 that is in thermal communication with each of the condensers 62. A refrigerant flow 65 accepts heat from the core gas flow 50 in each of the plurality of condensers 62. Although the example condensers 62 are shown within the nacelle assembly 26, the condensers 62 may be disposed only partially within the nacelle assembly 26 and remain within the contemplation and scope of this disclosure.

The location of the core engine 22 forward of the nacelle assembly 26 frees up space aft of the fan 24. The free space provides for a refrigerant condenser, shown schematically at 48, of an increased size. The cooling air flow 54 is routed into the tail cone 58 and through the refrigerant condenser 48 to cool the refrigerant flow 65 after accepting heat in the condenser 62. Water from the water separator 64 may be stored in a tank, shown schematically at 124 to accommodate variations in water recovery. A pump 126 may be utilized to drive water flow to the evaporator assembly 42.

In this disclosed example, the evaporator assembly 42 includes a plurality of evaporators 66 disposed about a circumference of the nacelle assembly 26. Heat from the core as flow 50 is utilized to transform the water flow 68 into a steam flow 56. The plurality of evaporators 66 are disposed about a circumference of the nacelle assembly 26 proximate to the inlet 32. Although the example evaporator assembly 42 and evaporators 66 are shown by way of example within the nacelle assembly 26, portions of the evaporator assembly 42 and evaporators 66 may be disposed at least partially outside of the nacelle assembly 26 and remain within the contemplation and scope of this disclosure.

Figure 5:
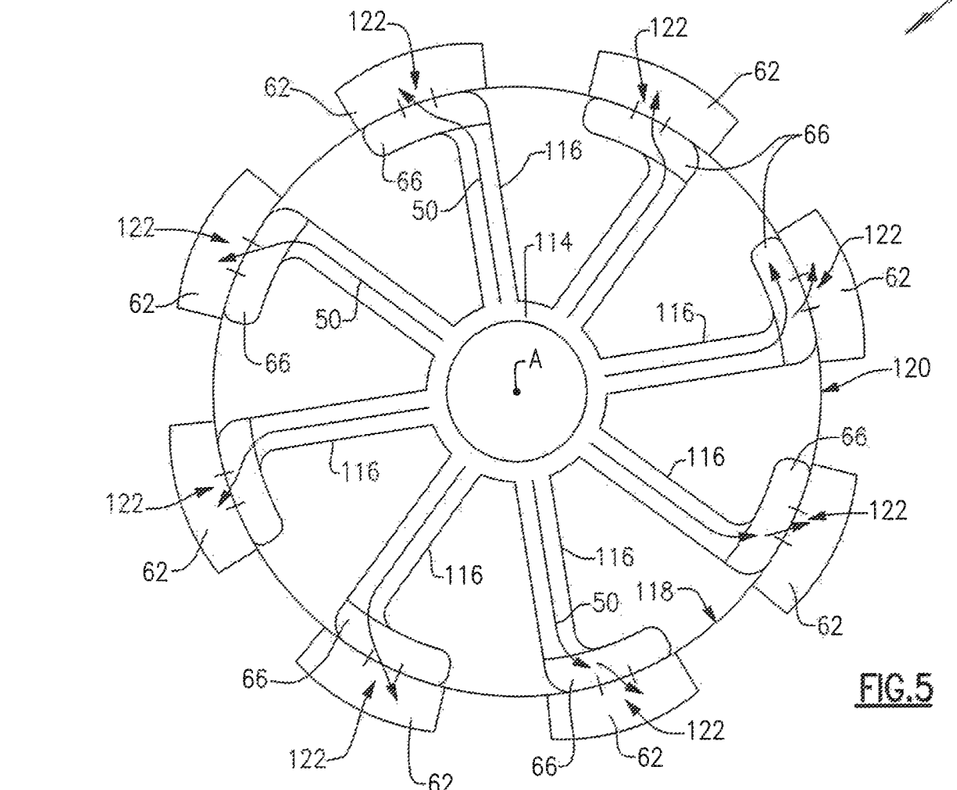
FIG. 5 is front view of an exhaust duct of the example aircraft propulsion system.
Figure 6:
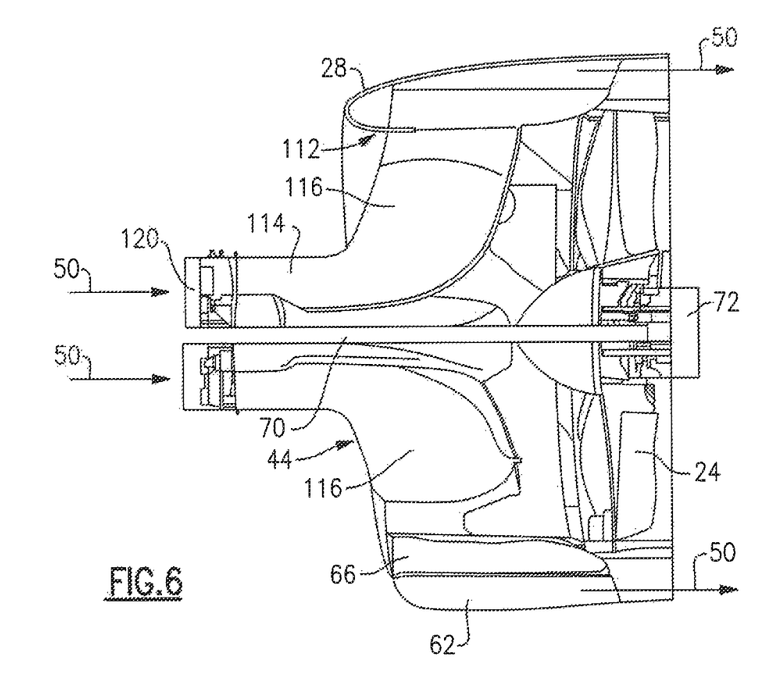
FIG. 6 is an enlarged cross-sectional view of the example exhaust duct of the aircraft propulsion system.

Referring to FIGS. 5 and 6 with continued reference to the previous Figures, the exhaust duct 44 is schematically shown and defines a path for communicating the core flow 50 radially outward to the evaporators 66 and condensers 62. In one example embodiment, the evaporators 66 are disposed, at least partially along an inner surface 118 of the nacelle assembly 26 and the condensers 62 are at radially outward of the evaporators 66.

The exhaust duct 44 includes a central portion 114 that is coupled to a turbine exhaust case 78 at an aft portion of the core engine 22. Radial passage portions 116 extend from the central portion 114 to each of the plurality of evaporators 66. The shaft 70 for driving the fan 24 extends through the central portion 114. The radial passage portions 116 are spaced circumferentially apart to provide passages for the inlet flow to the fan 24. In one example embodiment, one radial passage portion 116 is provided for each of the evaporators 66 disposed within the nacelle assembly 26. However, the number of passage portions 116 could be changed to accommodate different evaporator configurations and remain within the contemplation of this disclosure.

The example exhaust duct 44 is disclosed as a single unitary part with the radial passage portions 116 being provided as curved transitions to turn the axially directed core flow 50 radially outward to each of the evaporators 66. The passage portions 116 may further curve circumferentially to direct flow into the corresponding one of the evaporators 66. Each of the evaporators 66 include a passage 122 for communicating the core flow 50 to one of the condensers 62. In one disclosed example embodiment, the number of evaporators 66 and condensers 62 are the same such that the core flow 50 is divided evenly through the passage portions 116.

Figure 7:
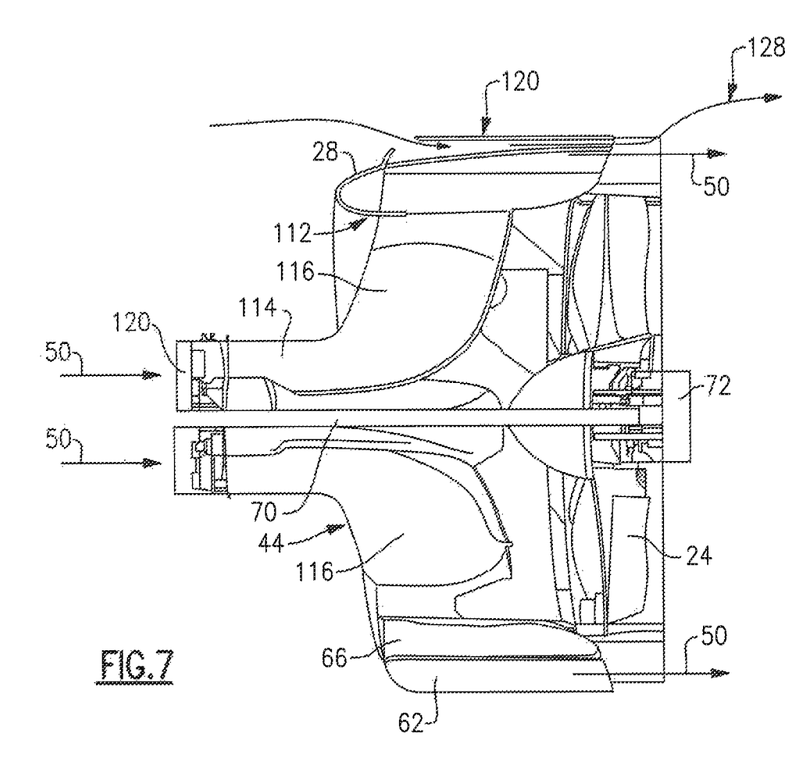
FIG. 7 is another enlarged cross-section of the example exhaust duct of the aircraft propulsion system.

Referring to FIG. 7, in another example embodiment, a ram air passage 120 is disposed in the nacelle 28 and provides for a ram air flow 128 to be placed in thermal communication with the condenser 62. The ram air flow 128 reduces and/or eliminates the need for the refrigerant flow for cooling of the condensers 62.

Referring to FIGS. 1, 3, and 4, an example operational embodiment includes generating the core flow 50 in the core engine 22. The core flow 50 is generated from a hydrogen based fuel and the steam flow 56 that is injected into the core flow 50. A shaft 70 is driven by a power turbine 80 (FIG. 3) through which the core flow 50 expands. The core flow 50 is then exhausted through the turbine exhaust case 78 into the exhaust duct 44.

In the exhaust duct 44, the core flow 50 is directed radially outward through one of the pluralities of radial passages 116 to one of the evaporators 66. The core flow 50 is then communicated to one of the condensers 62 and cooled to liquify water. The refrigerant system 46 cools the core flow 50 by providing the refrigerant flow 65 through the closed loop refrigerant circuit 60. A cooling flow 54 is routed across the refrigerant condenser 48 to cool the warmed refrigerant flow 65. Alternatively, the ram air flow 128 could be utilized for cooling the core flow 50 within the condensers 62.

The cooled core flow 50 with liquified water content is routed to the water separators 64. In one disclosed example, a plurality of water separators 64 are provided that correspond with each of the condensers 62. However, one water separator 64 that receives the cooled core flow 50 could be utilized and is within the contemplation of this disclosure. Separated water is communicated either to a water tank 124 and/or directly to each of the evaporators 66. The remaining gaseous portion of the core flow 50 is exhausted to the ambient environment. The water flow to the evaporators 66 is transformed into the steam flow 56 with heat from the core flow 50. The steam flow 56 is communicated to the core engine 22 and injected in to the core flow path C.

Although an example engine configuration is described by way of example, it will be appreciated that other engine configurations may include additional structures and features and are within the contemplation and scope of this disclosure.

Accordingly, the example propulsion system embodiments include evaporator and condenser systems with increased efficiencies by providing corresponding heat exchangers within the nacelle assembly such that larger forward surface areas can be utilized. Moreover, the forward mounted gas generating core engine provides additional space within the nacelle assembly for a refrigeration system.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A nacelle assembly for a turbine engine comprising:
  a nacelle housing surrounding a core engine and a propulsor section;
  a condenser assembly supported at least partially within the nacelle housing, the condenser assembly configured to recover water from a core gas flow generated by the core engine;
  an exhaust duct extending between the nacelle housing and the core engine, the core gas flow is directed radially outward through the exhaust duct to the condenser assembly; and
  an evaporator assembly supported at least in part within the nacelle housing and in thermal communication with at least a portion of the exhaust duct where heat from the core gas flow is utilized to heat a water flow to generate a steam flow injected into the core flow path, wherein the exhaust duct comprises a plurality of passages with each including a radial portion where the core gas flow is directed radially outward to the condenser assembly, a circumferential portion in thermal communication with the evaporator assembly, and an outlet communicating the core gas flow to the condenser assembly.

2. The nacelle assembly as recited in claim 1, wherein the exhaust duct extends forward of the propulsor section to an aft end of the core engine.

3. The nacelle assembly as recited in claim 2, wherein the nacelle housing includes a bypass passage for a fan airflow that extends between a forward inlet and an aft exhaust opening, the exhaust duct is supported within the forward inlet and the core engine is supported forward of the exhaust duct.

4. A propulsion system for an aircraft comprising:
  a core engine generating a core gas flow;
  a propulsor section driven by the core engine and disposed aft of the core engine;
  a nacelle surrounding the core engine and the propulsor section;
  a water recovery system disposed at least in part in the nacelle;
  a refrigeration system disposed aft of the propulsor section where a cooling medium is circulated through a cooling circuit to cool a portion of the water recovery system, the refrigeration system includes a refrigerant condenser for cooling the cooling medium, and the refrigerant condenser is in thermal communication with a bypass flow through the propulsor section for condensing the cooling medium;
  an exhaust duct where the core gas flow is directed radially outward from the core engine to the nacelle; and
  an evaporator assembly in thermal communication with the exhaust duct where water recovered by the water recovery system is heated to generate a steam flow subsequently communicated to the core engine.

5. The propulsion system as recited in claim 4, wherein the water recovery system includes a condenser assembly and a water separator, wherein the cooling circuit is in thermal communication with the condenser assembly for condensing water recovered from the core gas flow.

6. The propulsion system as recited in claim 5, wherein the condenser assembly comprises a plurality of condensers disposed about a circumference of the nacelle.

7. The propulsion system as recited in claim 4, including an intercooling system configured to inject recovered water into a compressor section of the core engine to reduce a temperature of a core airflow within a core flow path, the intercooling system receiving recovered water from the water recovery system.

8. A propulsion system for an aircraft comprising:
a core engine generating a core gas flow;
a propulsor section driven by the core engine and disposed aft of the core engine;
a nacelle surrounding the core engine and the propulsor section;
a water recovery system disposed at least in part in the nacelle, the water recovery system including a condenser assembly and a water separator, wherein the condenser assembly comprises a plurality of condensers disposed about a circumference of the nacelle;
a refrigeration system disposed aft of the propulsor section where a cooling medium is circulated through a cooling circuit to cool a portion of the water recovery system, the refrigeration system includes a refrigerant condenser for cooling the cooling medium, and the refrigerant condenser is in thermal communication with a bypass flow through the propulsor section for condensing the cooling medium, wherein the cooling circuit is in thermal communication with the condenser assembly for condensing liquid water from the core gas flow;
an exhaust duct where the core gas flow is directed radially outward from the core engine to the nacelle; and
an evaporator assembly in thermal communication with the exhaust duct where water recovered by the water recovery system is heated to generate a steam flow subsequently communicated to the core engine, wherein the exhaust duct comprises a plurality of passages extending radially outward from the core engine to a corresponding one of the plurality of condensers such that core gas flow is communicated through the plurality of passages to each of the plurality of condensers.

9. The propulsion system as recited in claim 8, wherein the evaporator assembly comprises a plurality of evaporators disposed at least partially within the nacelle and in thermal communication with a portion of each of the plurality of passages of the exhaust duct.

10. The propulsion system as recited in claim 9, wherein each of the plurality of passages of the exhaust duct include a radial portion routing the core gas flow radially outward and a circumferential portion in thermal communication with at least one of the plurality of evaporators.

11. The propulsion system as recited in claim 10, wherein each of the plurality of passages include an outlet communicating the core gas flow to a corresponding one of the plurality of condensers.

12. The propulsion system as recited in claim 11, including a gearbox driven by the core engine and coupled to drive the propulsor.

13. A propulsion system for an aircraft comprising:
a core engine including a core flow path where air is compressed in a compressor section, communicated to a combustor section, mixed with a hydrogen fuel and ignited to generate a core gas flow that is expanded through a turbine section;
a hydrogen fuel system configured to supply the hydrogen fuel to the combustor, the hydrogen fuel system including a fuel tank for the hydrogen fuel in communication with a fuel pump configured to generate a fuel flow for communication to the combustor;
a propulsor section driven by the core engine and disposed aft of the core engine;
a nacelle surrounding the core engine and the propulsor section;
a condenser assembly disposed at least partially within the nacelle;
an exhaust duct where the core gas flow is directed radially outward from the core engine to the condenser assembly in the nacelle;
an evaporator assembly in thermal communication with the exhaust duct where water recovered by the condenser assembly is heated to generate a steam flow injected into the core flow path; and
a refrigeration system disposed aft of the propulsor section where a cooling medium is circulated through a cooling circuit to cool a portion of the water recovery system, wherein the refrigeration system includes a refrigerant condenser for cooling the cooling medium, and the refrigerant condenser is in thermal communication with a bypass flow through the propulsor section for condensing the cooling medium.

14. The propulsion system as recited in claim 13, wherein the condenser assembly comprises a plurality of condensers disposed about a circumference of the nacelle.

15. The propulsion system as recited in claim 14, wherein the exhaust duct comprises a plurality of passages extending radially outward from the core engine to a corresponding one of the plurality of condensers such that core gas flow is communicated through the plurality of passages to each of the plurality of condensers.

16. The propulsion system as recited in claim 15, wherein each of the plurality of passages of the exhaust duct include a radial portion routing core gas flow radially outward and a circumferential portion in thermal communication with the evaporator assembly and an outlet communicating the core gas flow to a corresponding one of the plurality of condensers.

* * * * *